Patented June 1, 1937

2,082,198

UNITED STATES PATENT OFFICE 2,082,198

METHOD OF PRODUCING ANIMAL FEED

Erwin Baur, deceased, late of Muncheberg/Mark, Germany, by Elisabeth Baur, geb. Venedey, administratrix, Muncheberg/Mark, Germany, assignor to Saatgut-Erzeugungs-Gesellschaft m. b. H., Berlin, Germany No Drawing. Application April 9, 1934, Serial No. 719,742. In Germany December 17, 1932

3 Claims. (Cl. 99—2)

The invention relates to oils, fats, oil-cake, oil-meal and the like and to the manufacture of these products.

A great number of different plants are known, the fruits or seeds of which are rich in oil, important representatives being for instance the olive and the soja bean. However, in many countries there is need of plants suitable for manufacturing oil and which will grow under conditions obtaining in such countries, particularly under more temperate climates than are suitable for olives, soja beans, cocos nuts etc. According to the present invention the seeds of lupines are worked up for oils, fats, oil-cake, oil-meal and the like.

It is known that, as well as a great number of other plants, lupines, too, contain a certain percentage of oil. Yet, for various reasons, it has not been possible to manufacture oil from lupines on a commercial scale. Among these reasons, the poorness in oil of the lupines may be mentioned in first place. Further, it is well-known that lupines contain a bitter principle and that the seeds are poisonous. The bitterness of the lupines is due to alkaloids, the percentage in alkaloids varying between about 0.3 to 1.2% in the seeds of the lupines. This bitter principle would make it impossible to use the oil of the lupine as a high class human food, furthermore the bitterness makes it impossible to use a lupine oil-cake as a stock-food.

I have found by long and careful investigations that it is possible to overcome the various previously mentioned difficulties. More particularly I have found that it is possible to overcome the difficulty of poorness in oil of the lupines, as well as the difficulty residing in the bitterness of the lupines. Accordingly I have invented a method of manufacturing oil from lupines on a commercial scale. In the following I shall in detail describe the various lines and the various modes for carrying out my invention. My invention also comprehends the possibility of agriculturally cultivating plants which hitherto have never been cultivated, and my invention is also concerned with agriculturally cultivating oil plants which never before have been cultivated for that purpose.

In connection with one feature of the present invention it is proposed to manufacture oil and other products from the seeds of Lupinus mutabilis and Lupinus cruikshanksii. These two species grow as wild plants in South America. As far as I know, these plants have been occasionally, but very seldom, grown in North America as well as in Europe, as ornamental plants in gardens. Nobody, to my knowledge, has ever thought of growing these lupines as agricultural plants.

In accordance with my invention I propose to agriculturally cultivate Lupinus mutabilis and Lupinus cruikshanksii. I have found that, though the habitat of these plants is in subtropic climates, these species will ripen also under temperate climate conditions. Further the seeds of these two species of lupines can be easily gathered, as the pods of these species of lupines do not burst in the field, as do the pods of other species of lupines.

I further proposed to manufacture oil and other products from the seeds of Lupinus mutabilis and Lupinus cruikshanksii. These seeds contain about 14% of oil. A more detailed description of the technical method of manufacturing the oil and other products will be given in a later part of this specification.

According to an improved modification of my invention the oil and the other products are manufactured from lupine seeds which are poor in alkaloids or which are alkaloid-free. In this connection I have not in mind lupine seeds which originally contained a bitter principle and which were artificially disembittered. My invention in this improved modification is concerned with the manufacture of oil and other products from lupine seeds with natural poorness or freeness of alkaloids. A more definite explanation of the expressions "poorness in alkaloids" and "freeness in alkaloids", respectively, may be given by stating that in speaking of "alkaloid-poor" or of "alkaloid-free" lupines I have particularly in mind lupine seeds, the alkaloid content of which is less than 0.03%; preferably the percentage in alkaloids is even not higher than 0.01%. It is understood that the oil manufactured from this alkaloid-free or alkaloid-poor lupine seeds will contain still lower percentages of alkaloids.

One method of breeding alkaloid-free and alkaloid-poor varieties, respectively, will now be described in a few words. I have found that among millions of bitter lupine plants there will be a few individual plants which are free or substantially free from alkaloids. I have selected these substantially alkaloid-free individuals and have propagated them, and I have ascertained that the freeness or poorness in alkaloids is a hereditary characteristic of the thus selected plants.

In an attempt to further improve my present invention I have further found that it is possible to substantially increase the content in oil of lupines, this result being achievable by the method of plant breeding, for instance, by selection, too. These methods are well known per se and accordingly need not to be described in great detail. I have found that the content of oil can be increased in *Lupinus mutabilis* and *Lupinus cruikshanksii* to a content of oil in the seeds of more than 16%. This is an important point in connection with my invention as with a thus increased percentage in oil the lupines approximate the richness of oil of the soja-bean.

Further, I have found that for other species of lupines the oil content can be increased by selection methods well known per se, to the plant breeders. I have found that the percentage of oil can be more than doubled. It is known that the seeds of the ordinary blue and yellow lupines (*Lupinus angustifolius* and *Lupinus luteus*) have an average content of oil of about 5 to 6%, the seeds of the ordinary white lupine (*Lupinus albus*) having a content of about 6 to 7% of oil. I have found that some few individual plants of these species contain much more oil. By selecting these individual plants and carefully propagating them, it is possible to breed from the various species of lupines new varieties which are rich in oil. I have previously mentioned a number of species of lupines. Other lupines which can be advantageously treated in this manner are, for instance, *Lupinus thermis*, *Lupinus perennis* and *Lupinus polyphillus*.

It is highly desirable to breed new varieties which combine richness in oils with poorness in alkaloids. This can be accomplished by selecting and propagating from an already alkaloid-free or alkaloid-poor variety of lupines those individual plants which are rich in oil; or it can be done by selecting from varieties of lupines rich in oil those individual plants which have a low content of alkaloids. The same result may be achieved by making from ordinary varieties of lupines a combined selection along the two lines, richness in oil, and poorness in alkaloids. Still other breeding methods present themselves for the stated purposes to a skilled plant breeder.

The agricultural cultivation of *Lupinus mutabilis* and *Lupinus cruikshanksii*, as well as of substantially alkaloid-free and/or oil rich varieties of other lupines may be in general performed along the same agricultural methods which are used for the cultivating of lupines for green manuring in countries of temperate climates, such as Germany.

The technical methods of manufacturing the oils, fats, animal fodder and other products from lupines according to the invention, will now be described. The seeds of the lupines are preferably first crushed in suitable crushing devices. According to one manufacturing method the crushed material is then subjected to a substantial pressure, for instance by means of a hydraulic press. At the same time heat may be applied. By means of the pressure the oil is expressed and is then preferably subjected to a purifying treatment. According to another method the crushed seeds are treated with chemical agents such as, for instance, benzine or benzol, for extracting the oily or fatty components from the seeds. Other chemicals suitable for this purpose may be used as well. Most of the chemicals which are ordinarily applied for thus chemically separating oil from seed of plants are solvents for the oils in question, and accordingly the oils or fats will be found dissolved in these agents after the crushed seeds are treated with the chemicals. The fats and oils are then separated from the chemicals in any suitable way, for instance, by expelling the solvents by evaporation. The remaining oils or fats are then subjected to a purification.

It is to be understood, that other suitable and known methods may be used as well for separating the oils from the seeds. Insofar as methods of manufacturing oils and fats from the seeds of various plants are known per se, it is not deemed necessary to describe in more detail the different steps of manufacture.

The thus manufactured oils and fats of the lupines can be used for various purposes, such as human food, and for various technical purposes, for instance as machine oils and machine fats.

When the oil is separated from the seeds of the lupines, the solid component of the crushed material remains as a residue of the manufacture. If the oil was expressed by means of pressure, the residue has the form of a press-cake or oil-cake, whereas, in case a chemical extraction method is employed, a more loose residue will be formed. According to the invention the residues produced by the previously described manufacture of oil from lupines are used for various purposes. These residues form a very rich fodder for animals. For this purpose the oil-cake which is the residue of oil manufacturing methods by application of pressure may be, for instance, used in the form or shape given to the cake by the oil press itself, or the residues of the oil pressing or oil extracting methods may be ground and used as so called oil-meal. The residues can be also used for manuring and other purposes.

It might be pointed out that the press-cake and the other previously mentioned fodders are very rich in protein and carbohydrates. The press-cake and other fodder products particularly also still contain the water soluble proteins and carbohydrates. This is an important point, as these water soluble components are readily digestible.

In this connection it might be pointed out, that a few species of lupines, such as *Lupinus albus*, *Lupinus luteus* and *Lupinus angustifolius*, have been in some countries cultivated for green manuring. Occasionally the seeds of these species were gathered and used as a fodder after being disembittered by repeated extraction with water. By this treatment, however, valuable water soluble components were extracted, which are the most readily digestible proteins and carbohydrates. The thus treated lupine seeds are therefore not a high grade fodder. Moreover, substantial amounts of alkaloids usually remain in the seeds, and the stock will not eat the resulting fodder.

While I have herein described preferred embodiments of my invention, it is to be understood that the invention is not limited to the precise methods and products described, but is capable of various modifications without departing from the field and scope of my invention, and I intend to include all such variations, as fall within the scope of the appended claims, in this application in which the preferred forms only of my invention are disclosed.

I claim:

1. The process of producing a high grade animal feed rich in soluble proteins and carbohydrates and substantially free of alkaloids, which comprises breaking up a mass of lupine seeds having an oil content of substantially not less than 16% and having an alkaloid content of not substantially more than 0.03% and extracting the oil from said broken up seeds while retaining the water soluble proteins and carbohydrates intact in said residue whereby said residue retains said soluble proteins and carbohydrates and is substantially free of alkaloids.

2. The process of claim 1 further characterized in that the alkaloid content of the seeds is not substantially in excess of 0.01%.

3. The process of claim 1 further characterized in that the seeds are derived from the class of lupines of the species *Lupinus mutabilis* and *Lupinus cruikshanksii*.

ELISABETH BAUR, GEB. VENEDEY,
Administratrix of the Estate of Edwin Baur, Deceased.